(12) United States Patent
Rai (10) Patent No.: US 8,144,364 B2
(45) Date of Patent: Mar. 27, 2012

(54) METHODS AND SYSTEMS FOR PROCESSING HEAVY-TAILED JOB DISTRIBUTIONS IN A DOCUMENT PRODUCTION ENVIRONMENT

(75) Inventor: Sudhendu Rai, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 1223 days.

(21) Appl. No.: 11/779,392

(22) Filed: Jul. 18, 2007

(65) Prior Publication Data

US 2009/0025000 A1 Jan. 22, 2009

(51) Int. Cl.
*H04N 1/40* (2006.01)
(52) U.S. Cl. .................. 358/1.9; 358/468; 358/1.13
(58) Field of Classification Search ............... 358/1.9, 358/2.1, 400, 500, 437, 468, 1.13; 718/102–107
See application file for complete search history.

(56) References Cited

U.S. PATENT DOCUMENTS

| | | | |
|---|---|---|---|
| 5,095,369 | A | 3/1992 | Ortiz et al. |
| 5,513,126 | A | 4/1996 | Harkins et al. |
| 5,559,933 | A | 9/1996 | Boswell |
| 6,223,205 | B1 * | 4/2001 | Harchol-Balter et al. .... 718/105 |
| 6,509,974 | B1 | 1/2003 | Hansen |
| 6,573,910 | B1 | 6/2003 | Duke et al. |
| 6,631,305 | B2 | 10/2003 | Newmark |
| 6,633,821 | B2 | 10/2003 | Jackson et al. |
| 6,762,851 | B1 | 7/2004 | Lynch et al. |
| 6,805,502 | B2 | 10/2004 | Rai et al. |
| 6,925,431 | B1 | 8/2005 | Papaefstathiou |
| 6,961,732 | B2 | 11/2005 | Hellemann et al. |
| 6,993,400 | B2 | 1/2006 | Viassolo |
| 7,016,061 | B1 | 3/2006 | Hewitt |
| 7,051,328 | B2 | 5/2006 | Rai et al. |
| 7,061,636 | B2 | 6/2006 | Ryan et al. |
| 7,065,567 | B1 | 6/2006 | Squires et al. |

(Continued)

FOREIGN PATENT DOCUMENTS

CA 2503427 A1 10/2005

(Continued)

OTHER PUBLICATIONS

Harchol-Balter, et al., "On Choosing a Task Assignment Policy for a Distributed Server System," IEEE Journal of Parallel and Distributed Computing, 1999, pp. 204-228.

(Continued)

*Primary Examiner* — Thomas D Lee
*Assistant Examiner* — Stephen M Brinich
(74) *Attorney, Agent, or Firm* — Pepper Hamilton LLP (57) ABSTRACT

A production printing system for processing a plurality of print jobs may include a plurality of print job processing resources and a computer-readable storage medium including one or more programming instructions for performing a method of processing a plurality of print jobs in a document production environment. The method may include identifying a print job size distribution for a plurality of print jobs in a document production environment and determining whether the print job size distribution exhibits a heavy-tail characteristic. For each print job size distribution that exhibits a heavy-tail characteristic, the plurality of print jobs may be grouped into a plurality of subgroups such that at least one of the plurality of subgroups exhibits a non-heavy-tail characteristic, and each job in the at least one of the plurality of subgroups exhibiting the non-heavy-tail characteristic may be processed by one or more print job processing resources.

28 Claims, 10 Drawing Sheets

U.S. PATENT DOCUMENTS

| | | |
|---|---|---|
| 7,079,266 B1 | 7/2006 | Rai et al. |
| 7,092,922 B2 | 8/2006 | Meng et al. |
| 7,092,963 B2 | 8/2006 | Ryan et al. |
| 7,099,037 B2 | 8/2006 | Clark et al. |
| 7,125,179 B1 | 10/2006 | Rai et al. |
| 7,148,985 B2 | 12/2006 | Christodoulou et al. |
| 7,152,589 B2 | 12/2006 | Ekeroth et al. |
| 7,161,699 B2 | 1/2007 | Matoba |
| 7,200,505 B2 | 4/2007 | Shan |
| 7,206,087 B2 | 4/2007 | Ryan et al. |
| 7,382,484 B2 | 6/2008 | Matsukubo et al. |
| 7,523,048 B1 | 4/2009 | Dvorak |
| 7,548,335 B2 | 6/2009 | Lawrence et al. |
| 7,562,062 B2 | 7/2009 | Ladde et al. |
| 7,576,874 B2 | 8/2009 | Farrell et al. |
| 7,584,116 B2 | 9/2009 | Kakouros et al. |
| 7,590,937 B2 | 9/2009 | Jacobus et al. |
| 7,689,694 B2 | 3/2010 | Kato et al. |
| 7,761,336 B1 | 7/2010 | Blankenship et al. |
| 7,949,740 B2 | 5/2011 | Scrafford et al. |
| 2001/0055123 A1 | 12/2001 | Ryan et al. |
| 2002/0016803 A1 | 2/2002 | Ryan et al. |
| 2002/0054344 A1 | 5/2002 | Tateyama |
| 2002/0071134 A1 | 6/2002 | Jackson et al. |
| 2002/0198794 A1 | 12/2002 | Williams et al. |
| 2003/0079160 A1 | 4/2003 | McGee et al. |
| 2003/0098991 A1 | 5/2003 | Laverty et al. |
| 2003/0105661 A1 | 6/2003 | Matsuzaki et al. |
| 2003/0121431 A1 | 7/2003 | Ohno |
| 2003/0149747 A1 | 8/2003 | Rai et al. |
| 2003/0200252 A1 | 10/2003 | Krum |
| 2003/0202204 A1 | 10/2003 | Terrill et al. |
| 2004/0135838 A1 | 7/2004 | Owen et al. |
| 2004/0136025 A1 | 7/2004 | Moriyama et al. |
| 2004/0239992 A1 | 12/2004 | Kawai et al. |
| 2004/0268349 A1 | 12/2004 | Ramakrishnan et al. |
| 2005/0060650 A1 | 3/2005 | Ryan et al. |
| 2005/0065830 A1 | 3/2005 | Duke et al. |
| 2005/0068562 A1 | 3/2005 | Ferlitsch |
| 2005/0096770 A1 | 5/2005 | Chua et al. |
| 2005/0114829 A1 | 5/2005 | Robin et al. |
| 2005/0134886 A1 | 6/2005 | Farrell et al. |
| 2005/0151993 A1 | 7/2005 | Gartstein et al. |
| 2005/0154625 A1 | 7/2005 | Chua et al. |
| 2005/0275875 A1 | 12/2005 | Jennings |
| 2006/0031585 A1 | 2/2006 | Nielsen et al. |
| 2006/0132512 A1 | 6/2006 | Walmsley et al. |
| 2006/0149755 A1 | 7/2006 | Marshall et al. |
| 2006/0224440 A1 | 10/2006 | Rai |
| 2006/0226980 A1 | 10/2006 | Rai et al. |
| 2007/0008580 A1 | 1/2007 | Tanaka |
| 2007/0019228 A1 | 1/2007 | Rai et al. |
| 2007/0070379 A1 | 3/2007 | Rai et al. |
| 2007/0078585 A1 | 4/2007 | Pomeroy et al. |
| 2007/0091355 A1 | 4/2007 | Rai |
| 2007/0092323 A1 | 4/2007 | Lin et al. |
| 2007/0124182 A1 | 5/2007 | Rai |
| 2007/0177191 A1 | 8/2007 | Eschbach et al. |
| 2007/0236724 A1 | 10/2007 | Rai et al. |
| 2007/0247657 A1 | 10/2007 | Zhang et al. |
| 2007/0247659 A1 | 10/2007 | Zhang et al. |
| 2007/0279675 A1 | 12/2007 | Quach et al. |
| 2007/0293981 A1 | 12/2007 | Rai |
| 2008/0013109 A1 | 1/2008 | Chen et al. |
| 2008/0201182 A1 | 8/2008 | Schneider et al. |
| 2008/0239368 A1 | 10/2008 | Ota |
| 2008/0256541 A1 | 10/2008 | Rai |
| 2009/0094094 A1 | 4/2009 | Rai et al. |
| 2009/0313061 A1 | 12/2009 | Rai et al. |
| 2009/0313063 A1 | 12/2009 | Rai |
| 2009/0327033 A1 | 12/2009 | Rai et al. |

FOREIGN PATENT DOCUMENTS

| | | |
|---|---|---|
| EP | 1630663 A2 | 1/2006 |
| EP | 1705556 A1 | 9/2006 |

OTHER PUBLICATIONS

Dueck, et al., "Threshold Accepting: A General Purpose Optimization Algorithm Appearing Superior to Simulated Annealing", Journal of Computational Physics vol. 90, Issue 1, Sep. 1990, pp. 161-175, Academic Press, Inc.

Rai, et al., "A Lean Document Production Controller for Printshop Management", Proceedings of the $42^{nd}$ IEEE Conference on Decision and Control, Maui, Hawaii, Dec. 2003.

Zheng et al., "Finding Optimal (s,S) Policies Is About as Simple as Evaluating a Single Policy", Operations Research, vol. 39, No. 4, (Jul.-Aug. 1991), pp. 654-665.

Bo Hu, "An Application of Inventory Models in Printing Industry", Ph.D. Candidate in Operations Management, The Simon School of Business, University of Rochester, Jul. 2007.

Veinott, Jr., et al.; "Computing Optimal (s,S) Inventory Policies", Management Science, vol. 11, No. 5, Series A., Sciences, Mar. 1965, pp. 525-552.

Simchi Levi, et al. "Designing & Managing The Supply Chain: Concepts, Strategies and Cases", Second Edition, 2000, McGraw Hill Higher Education, New York, New York.

Cleveland et al., "STL: A Seasonal-Trend Decomposition Procedure Based on Loess", Journal of Official Statistics, vol. 16, No. 1, 1990, pp. 3-33, Sweden.

Veinott, Jr., "Optimal Policy in a Dynamic, Single Product, Nonstationary Inventory Model with Several Demand Classes", Mar. 16, 1965, Operations Research, vol. 13, No. 5, Sep.-Oct. 1965, pp. 761-778.

Faraway, "Extending the Linear Model with R: Generalized Linear, Mixed Effects and Nonparametric Regression Models", 2006, Chapman & Hall/CRC, Boca Raton, Florida.

* cited by examiner

| JOB TYPE | COEFFICIENT OF VARIATION |
|---|---|
| JOB TYPE 1 | 2.6 |
| JOB TYPE 2 | 0.8 |
| JOB TYPE 3 | 1.0 |
| JOB TYPE 4 | 1.2 |
| JOB TYPE 5 | 2.4 |
| JOB TYPE 6 | 0.9 |
| JOB TYPE 7 | 0.8 |
| JOB TYPE 8 | 0.9 |
| JOB TYPE 9 | 2.1 |
| JOB TYPE 10 | 2.1 |

FIG. 9A

| JOB TYPE | COEFFICIENT OF VARIATION |
|---|---|
| JOB TYPE 1 | 2.6 |
| JOB TYPE 5 | 2.4 |
| JOB TYPE 9 | 2.1 |
| JOB TYPE 10 | 2.1 |

HIGH-VARIABILITY JOB TYPES

FIG. 9B

| JOB TYPE | COEFFICIENT OF VARIATION |
|---|---|
| JOB TYPE 2 | 0.8 |
| JOB TYPE 3 | 1.0 |
| JOB TYPE 4 | 1.2 |
| JOB TYPE 6 | 0.9 |
| JOB TYPE 7 | 0.8 |
| JOB TYPE 8 | 0.9 |

LOW-VARIABILITY JOB TYPES

METHODS AND SYSTEMS FOR PROCESSING HEAVY-TAILED JOB DISTRIBUTIONS IN A DOCUMENT PRODUCTION ENVIRONMENT

CROSS REFERENCE TO RELATED APPLICATIONS

This application is related to U.S. patent application Ser. Nos. 11/779,418; 11/779,437; and 11/779,454. This application is also related to co-pending U.S. patent application Ser. Nos. 11/779,464; 11/779,494 and U.S. patent application Ser. Nos. 11/779,512 and 10/946,756 filed Sep. 22, 2004.

BACKGROUND

Document production environments, such as print shops, convert printing orders, such as print jobs, into finished printed material. A print shop may process print jobs using resources such as printers, cutters, collators and other similar equipment. Typically, resources in print shops are organized such that when a print job arrives from a customer at a particular print shop, the print job can be processed by performing one or more production functions.

Scheduling architectures that organize print jobs arriving at a document production environment and route the print jobs to autonomous cells are known in the art and are described in, for example, U.S. Pat. No. 7,051,328 to Rai et al. and U.S. Pat. No. 7,065,567 to Squires et al., the disclosures of which are incorporated by reference in their entirety. Methods for automatically distributing jobs to a receiver on a network using devices are known in the art and are described in, for example, U.S. Pat. No. 5,513,126 to Harkins et al., the disclosure of which is incorporated by reference in its entirety.

It is common for print shops to receive print jobs having variable job sizes. Problems arise when a wide distribution of document or print job sizes exists. This may be referred to as a heavy-tailed distribution. Heavy-tailed distributions usually require significant data before the mean distribution can be computed with accuracy. For normal distributions, the sample mean converges to the population mean inversely as the square root of the sample size. For heavy-tailed distributions, however, the sample mean converges to the population mean inversely as $n^{1-(1/\alpha)}$. As such, as $\alpha$ approaches 1, the convergence rate may be very poor and the estimates of averages from simulations done on heavy-tailed distributions may be inaccurate.

Transaction print environments that process jobs having a heavy-tailed job-size distribution tend to have inefficient job flows. This is because these environments typically handle very large and very small jobs that are all part of one job pool. It is likely that several small jobs may be delayed if they are queued behind a very large job. Similarly, large jobs can experience flow interruptions if several small jobs requiring multiple setups are ahead of the large jobs in the queue.

Systems and methods for effectively processing heavy-tailed distributions in document production environments, notwithstanding poor convergence rates and possible inaccurate estimates of averages, would be desirable.

SUMMARY

Before the present methods are described, it is to be understood that this invention is not limited to the particular systems, methodologies or protocols described, as these may vary. It is also to be understood that the terminology used herein is for the purpose of describing particular embodiments only, and is not intended to limit the scope of the present disclosure which will be limited only by the appended claims.

It must be noted that as used herein and in the appended claims, the singular forms "a," "an," and "the" include plural reference unless the context clearly dictates otherwise. Thus, for example, reference to a "job" is a reference to one or more jobs and equivalents thereof known to those skilled in the art, and so forth, Unless defined otherwise, all technical and scientific terms used herein have the same meanings as commonly understood by one of ordinary skill in the art. As used herein, the term "comprising" means "including, but not limited to."

In an embodiment, a production printing system for processing a plurality of print jobs may include a plurality of print job processing resources and a computer-readable storage medium including one or more programming instructions for performing a method of processing a plurality of print jobs in a document production environment. The method may include identifying a print job size distribution for a plurality of print jobs in a document production environment and determining whether the print job size distribution exhibits a heavy-tail characteristic. For each print job size distribution that exhibits a heavy-tail characteristic, the plurality of print jobs may be grouped into a plurality of subgroups such that at least one of the plurality of subgroups exhibits a non-heavy-tail characteristic, and each job in the at least one of the plurality of subgroups exhibiting the non-heavy-tail characteristic may be processed by one or more print job processing resources.

A method of processing a plurality of jobs in a production environment may include identifying, with a computer, a job size distribution for a plurality of jobs in a production environment and determining, with the computer, whether the job size distribution exhibits a heavy-tail characteristic. For each job size distribution exhibiting a heavy-tail characteristic, the plurality of jobs may be grouped into a plurality of subgroups such that at least one subgroup does not exhibit a heavy-tail characteristic. One or more job processing resources may be configured in the production environment for one or more of the subgroups that do not exhibit the heavy-tail characteristic, and the one or more subgroups that do not exhibit the heavy-tail characteristic may be processed with the one or more job processing resources.

DETAILED DESCRIPTION

For purposes of the discussion below, a "print shop" refers to an entity that includes a plurality of document production resources, such as printers, cutters, collators and the like. A print shop may be a freestanding entity, including one or more print-related devices, or it may be part of a corporation or other entity. Additionally, a print shop may communicate with one or more servers by way of a local area network or a wide area network, such as the Internet, the World Wide Web or the like.

A "job" refers to a logical unit of work that is to be completed for a customer. A job may include one or more print jobs from one or more clients. A production system may include a plurality of jobs. Although the disclosed embodiments pertain to document production systems, the disclosed methods and systems can be applied to production systems in general.

A "print job" refers to a job processed in a document production system. For example, a print job may include producing credit card statements corresponding to a certain credit card company, producing bank statements corresponding to a certain bank, printing a document, or the like. Although the disclosed embodiments pertain to print jobs, the disclosed methods and systems can be applied to jobs in general in other production environments, such as automotive manufacturing, semiconductor production and the like.

Figure 1:
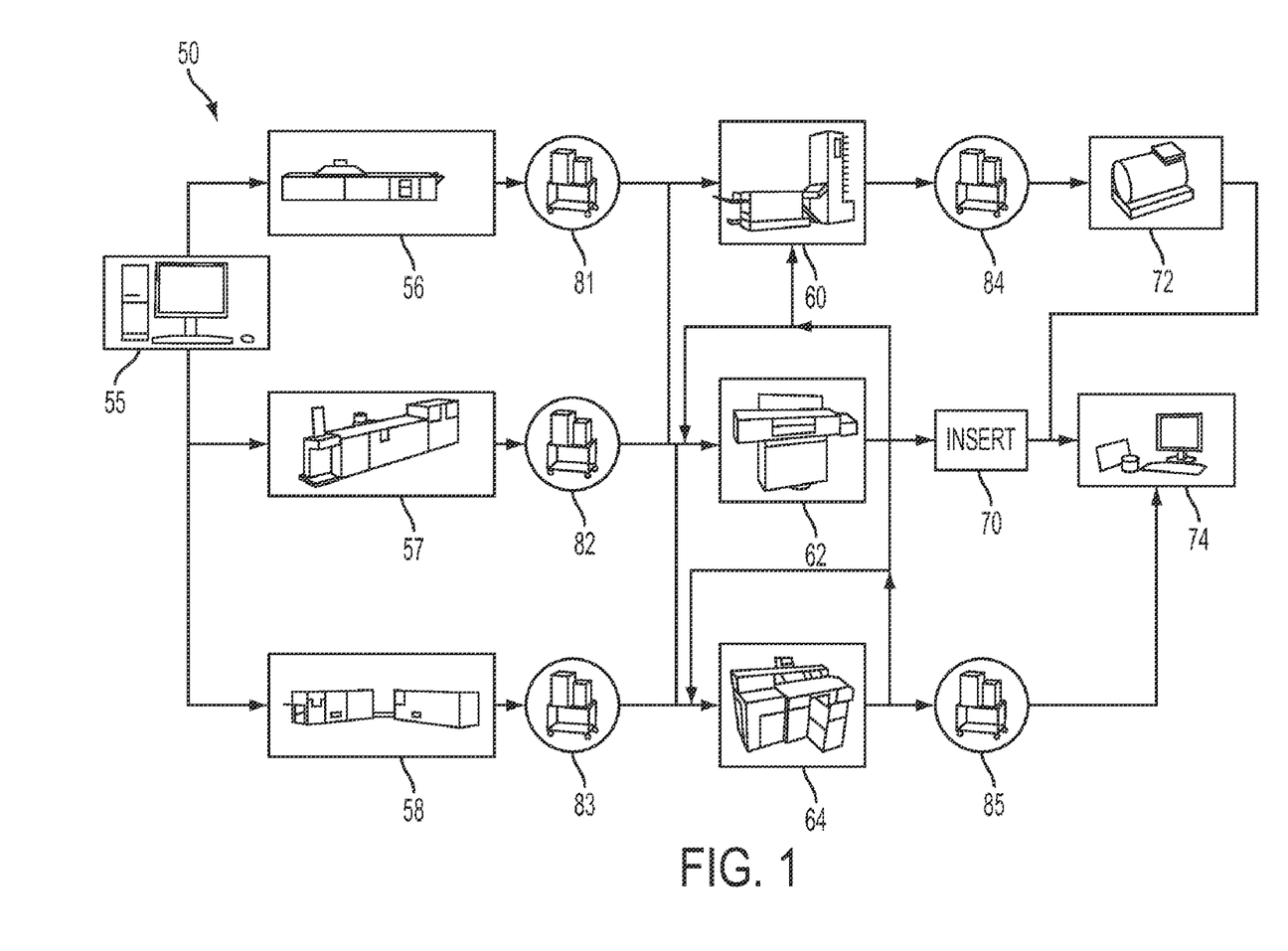
FIG. 1 illustrates an exemplary print shop production environment according to an embodiment.

FIG. 1 shows an example of a production environment 50, in this case, exemplary elements of a print shop. Print jobs may enter the print shop manually or electronically and be collected at an electronic submission system 55 such as a computing device and/or scanner. Jobs are sorted and batched at the submission system or another location before being delivered to one or more print engines such as a color printer 56, black-and-white printer 57 and/or a continuous feed printer 58. Jobs may exit the print engine and be delivered to one or more finishing devices or areas such as a collator 60, cutter 62, and/or binder 64. The finishing areas may include automatic or manual areas for such finishing activities and they also may include an automatic or manual inserter 70. Finally, jobs may move to a postage metering station 72 and/or shipping station 74. Jobs may move from one location to another in the print shop by automatic delivery or manual delivery such as by hand or by one or more paper carts 81-85.

A job size distribution may describe a probability distribution of a real-valued random variable, Examples of types of job size distributions may include normal distributions, exponential distributions, logarithmic distributions, cumulative distributions and the like.

A group of jobs having a large job size distribution may be referred to as having a heavy-tailed distribution. A heavy-tailed distribution may be characterized as a job size distribution possessing a tail that decays slowly. In other words, as the value of the random variable increases, a probability associated with the random variable decreases, however there still may be a finite probability associated with very large values of the random variable. Heavy-tailed distributions may have many small jobs mixed with a few very large jobs. A finite sample size drawn randomly from a heavy-tailed distribution may have very high variances. As such, even though the majority of the job sizes are small, a substantial contribution to the mean or variance for the jobs considered in the distribution may come from the few large jobs. Accordingly, the difference between the mean and median may be pronounced for heavy-tailed distribution.

In an embodiment, X may be a random variable with a cumulative density function ("CDF"), $F(x)=P[X \leq x]$. The area under the CDF from 0 to X as X approaches infinity may be equal to one. A complementary CDF("CCDF") may be represented by $F_c(x)=P[X>x]$, where the $CCDF=1-CDF$. The CDF may be heavy-tailed if the $CCDF \sim cx^{-\alpha}$ where $\alpha$ is between zero and two. As such, $$\lim_{x \to \infty} \frac{d \log F_c(x)}{d \log x} = -\alpha$$

Accordingly, the decay rate of a CCDF for large job sizes may be equal to $\alpha$. The decay rate of the CCDF may be represented by the slope of the log-log plot of CCDF versus a random variable for very large values of the random variable.

Figure 2:
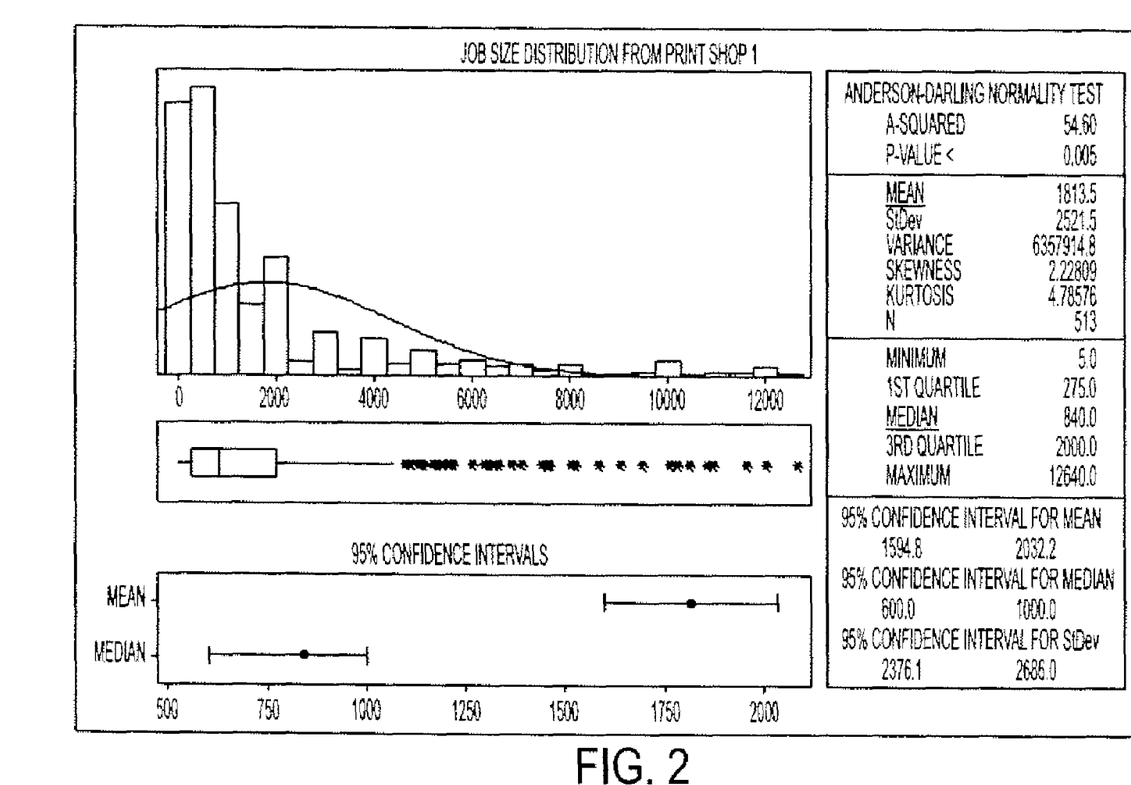
FIG. 2 depicts a graphical representation of a first job size distribution from a production environment according to an embodiment.
Figure 3:
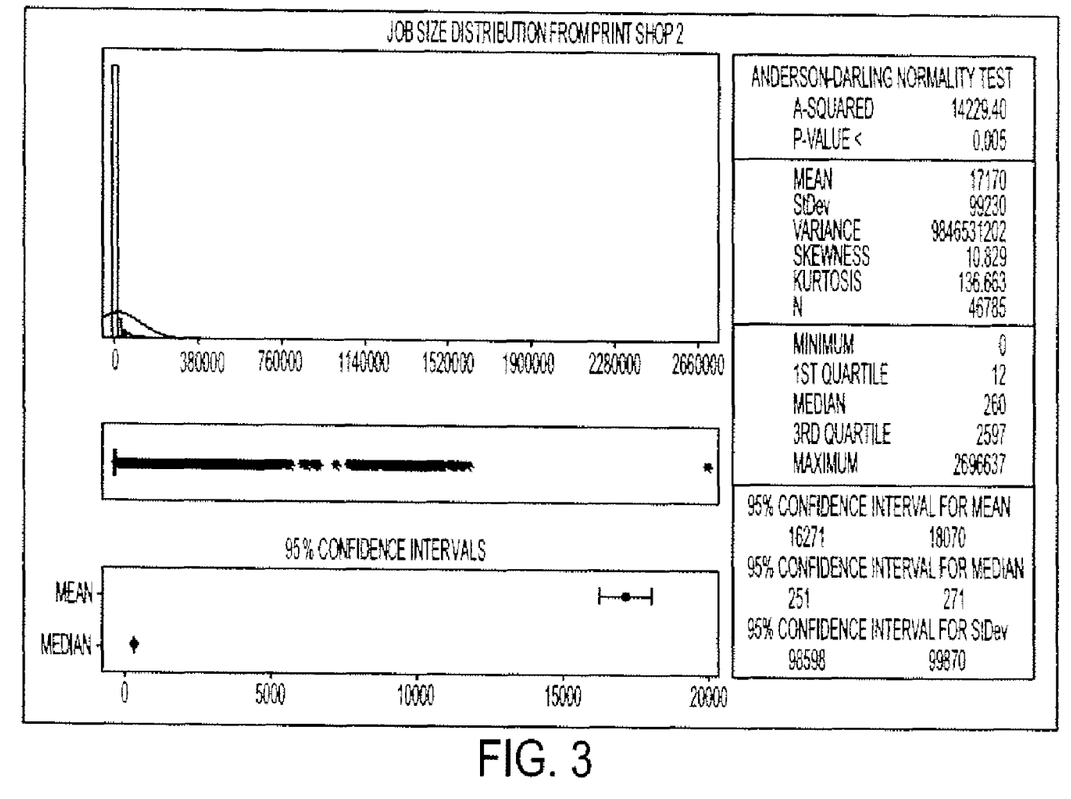
FIG. 3 depicts a graphical representation of a second job size distribution from another production environment according to an embodiment.
Figure 4:
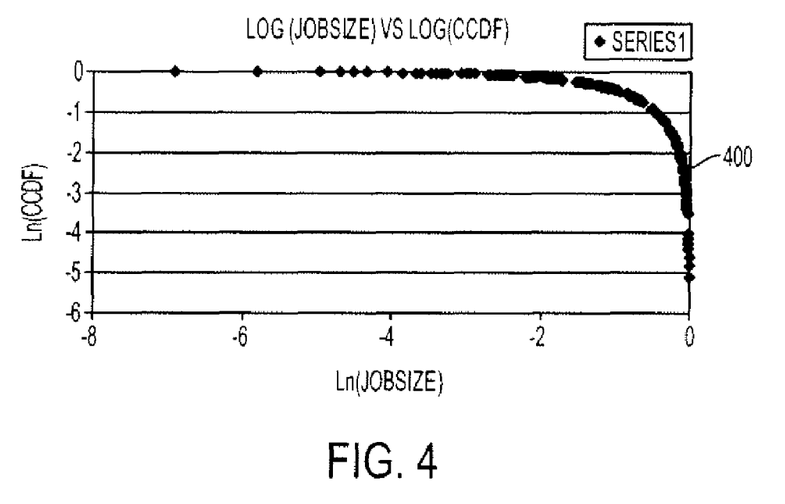
FIG. 4 depicts a plot of ln(CCDF) versus ln(job size) for a thin-tailed job size distribution, such as that illustrated in FIG. 2 according to an embodiment.
Figure 5:
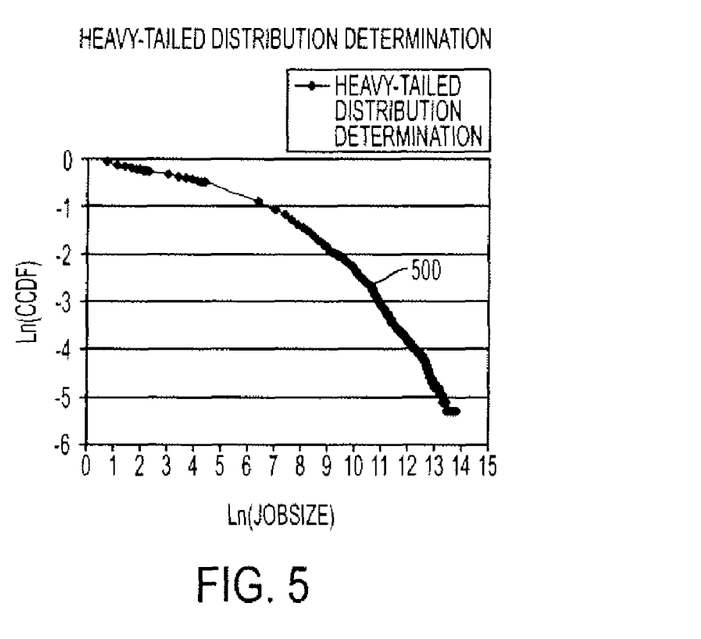
FIG. 5 depicts a plot of ln(CCDF) versus ln(job size) for a heavy-tailed job size distribution, such as that illustrated in FIG. 3 according to an embodiment.

FIG. 2 illustrates a graphical representation of a first job size distribution (JSD1) from a production environment. FIG. 3 illustrates a graphical representation of a second job size distribution (JSD2) from a different production environment. FIG. 4 illustrates a plot of the natural log("ln") of CCDF versus ln (job size) for JSD1. FIG. 5 illustrates a plot of ln (CCDF) versus ln (job size) for JSD2.

As illustrated by FIG. 4, the $$\lim_{x \to \infty} \frac{\ln(CCDF)}{\ln(x)},$$

or the slope of the curve 400 as x approaches very large values, where x represents job size, is approximately −6.4 for large job sizes. As illustrated in FIG. 5, the slope of the curve 500 is approximately −1.26 for large job sizes. In other words, for JSD1, $\alpha \sim 6.4$ and for JSD2, $\alpha \sim 1.26$. As such, JSD1 may be considered a thin-tailed distribution because $\alpha \sim 6.4$ (i.e., outside the range of minimum and maximum decay values, i.e., $0<\alpha<2$ range for heavy-tailed distributions). However, JSD2 may be considered a heavy-tailed distribution, because $\alpha \sim 1.26$ (i.e., inside the range of minimum and maximum decay values, i.e., $0<\alpha<2$ range for heavy-tailed distributions).

In an embodiment, the job size distribution may be tested for a heavy-tail characteristic by computing a decay rate of a complementary cumulative density function for the job size distribution for very large values of job sizes.

A heavy-tailed distribution may require significantly more data than a normal distribution before an accurate mean may be calculated. This is because, for normal distributions, the sample mean converges to the population mean inversely as the square root of the sample size. As such, for large sample sizes, the sample mean may be used as the population mean. The sample mean for heavy-tailed distributions, on the other hand, may converge to the population mean inversely as $n^{1-(1/\alpha)}$. As $\alpha$ approaches 1, the convergence rate may be very poor and the estimates of averages done on heavy-tailed distributions may be inaccurate.

Figure 6:
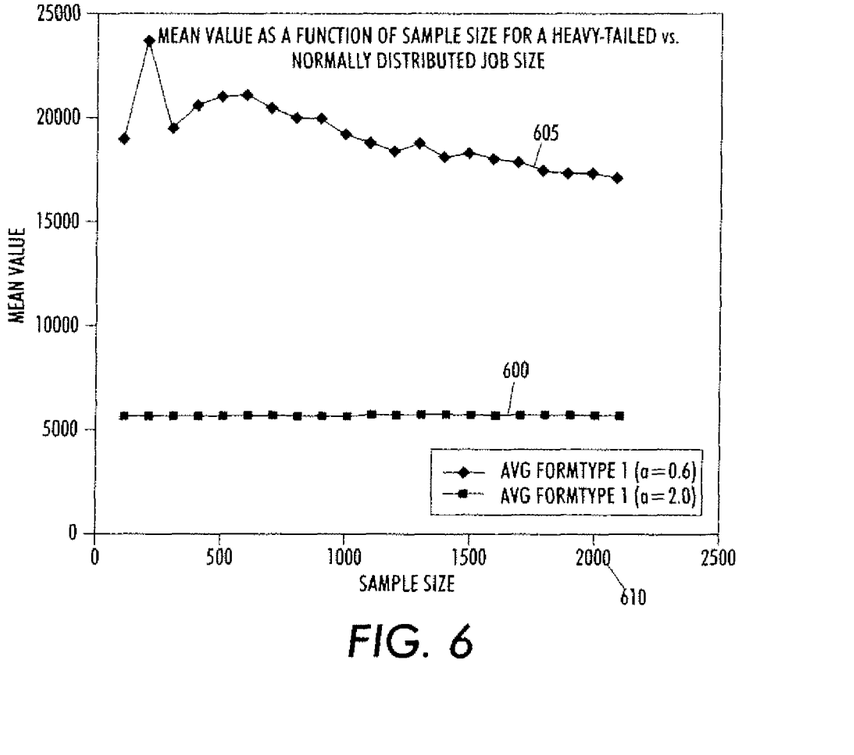
FIG. 6 illustrates the behavior of a heavy-tailed distribution as compared to a thin-tailed distribution over a range of job sizes according to an embodiment.

This problem is illustrated by FIG. 6, which shows a plot of the sample mean for a normal distribution as compared to a heavy-tailed distribution. The index of stability, α, for the heavy-tailed distribution 605 is 0.6. In comparison, the normal distribution 600 has an index of stability α=2. The index of stability may represent the decay rate of a complementary cumulative density function or the like. In an embodiment, the index of stability may be compared to a threshold value. For example, if the index of stability of a CCDF is less than a threshold value, the job size distribution may be identified as a heavy-tailed distribution. Similarly, if the index of stability of a CCDF exceeds the threshold value, the job size distribution may be identified as a thin-tailed distribution. In an embodiment, the threshold may be a value in the range of zero to two.

FIG. 6 illustrates the behavior of a heavy-tailed distribution 605 as compared to a thin-tailed distribution 600 (the normal distribution) over a range of job sizes. As the job size increases, the means of the two distributions may start approaching the population means. FIG. 6 shows a plot of the mean for a normal distribution 600 and a heavy-tailed distribution 605. As illustrated by FIG. 6, the mean quickly converges for the normal distribution 600. However, the mean of the heavy-tailed distribution 605 takes significantly longer to converge. As illustrated by FIG. 6, even after receiving 2000 datapoints 610, the sample mean does not show convergence.

In an embodiment, if a distribution is determined to be a heavy-tailed distribution, the jobs in the distribution may be grouped into a plurality of subgroups such that at least one subgroup exhibits a non-heavy-tail characteristic. A job size distribution may be split into two or more subgroups by selecting a threshold job size and calculating the α associated with the distribution to the right of the threshold job size. For example, referring back to FIG. 3, if a job size threshold of 20,000 is chosen, then a left-most distribution segment may range from 0 to 20,000 and a right-most distribution segment may range from 20,000 to 2,696,637. Because the left-most distribution segment is bounded, it is not a heavy-tailed distribution. Because, in practice, the random variable is unlikely to assume infinite values, the job set may be finite thus producing a finite distribution. As such, the variability of the right-most distribution may decrease as the threshold value increases, and the right-most distribution segment may be approximated as a thin-tailed distribution. As a job size threshold is increased, a distribution may become less and less similar to a heavy-tailed distribution because the variability associated with the distribution decreases.

Figure 7:
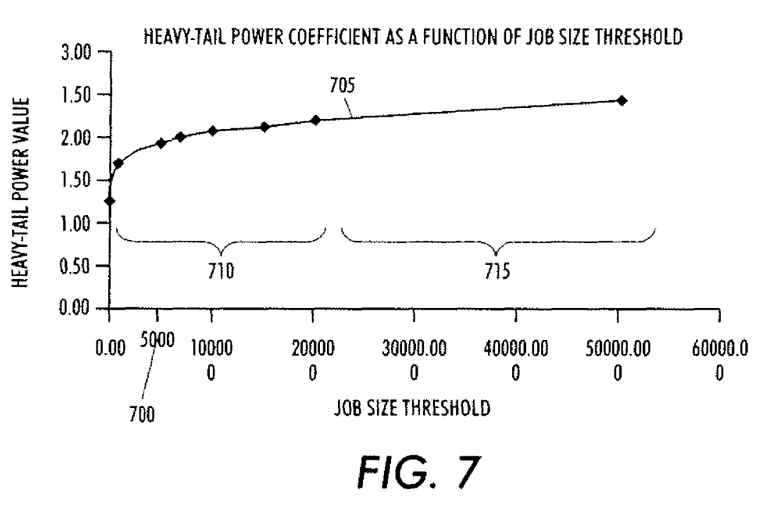
FIG. 7 depicts an exemplary plot of decay rate of a job size distribution versus certain job size threshold values according to an embodiment.

FIG. 7 illustrates a plot of the decay rate of the job size distribution depicted in FIG. 3 versus certain job size threshold values. As illustrated by FIG. 7, as the job size threshold increases, so does the decay rate. Somewhere above a job size threshold of 5,000 700, the resulting distribution 705 is no longer heavy-tailed because the decay rate is greater than or equal to two. As such, if 20,000 is selected as the job size threshold, the left-most distribution segment 710 (i.e., from 0 to 20,000) may be thin-tailed because the distribution is bounded while the left-most distribution segment 715 (i.e., from 20,000 to 50,000) may also mimic thin-tailed because the decay rate associated with the segment is greater than two.

In an embodiment, one or more autonomous cells may be configured for one or more subgroups. An autonomous cell refers to a group of resources used to process jobs. An autonomous cell may include the resources needed to complete at least one job type. For example, if the Job type includes printing, cutting and collating, an autonomous cell for processing the corresponding job may include at least one printer, one cutter and one collator. In an embodiment, one or more subgroups may be processed by a corresponding autonomous cell.

Figure 8:
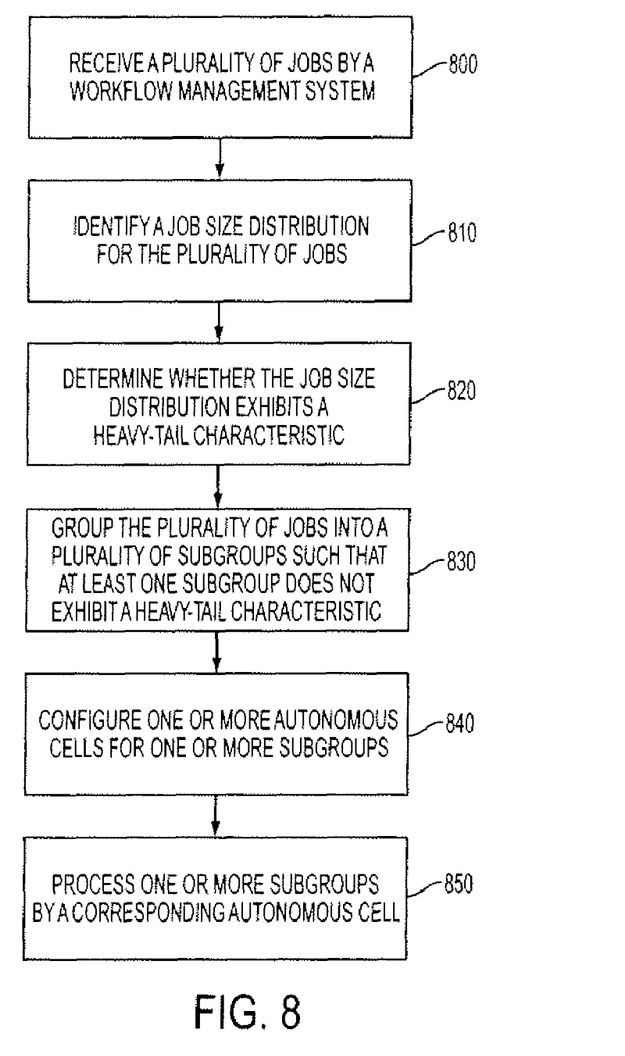
FIG. 8 depicts an exemplary flow chart of processing a plurality of jobs according to an embodiment.

FIG. 8 illustrates an exemplary flowchart of processing a plurality of jobs according to an embodiment. A plurality of jobs may be received 800 by a workflow management system, and a job size distribution for the plurality of jobs may be identified 810. The workflow management system may then determine 820 whether the Job size distribution exhibits a heavy-tail characteristic. If the job size distribution does exhibit a heavy-tail characteristic, the plurality of jobs may be grouped 830 into a plurality of subgroups such that at least one subgroup does not exhibit a heavy-tail characteristic. One or more autonomous cells may be configured 840 for one or more of the subgroups, and one or more of the subgroups may be processed 850 by a corresponding autonomous cell.

In an embodiment, processing the subgroups may entail analyzing the job types associated with the jobs in the subgroups. A job type refers to a sequence of functions required to process a job from start to finish. For example, in a document production environment, a print job may need to be printed, cut and collated. The job type associated with the job may be printing, cutting and collating because this is the necessary sequence of functions that must be performed to completely process the job. In an embodiment, the job type may be a representation of the necessary sequence of function that are necessary for processing the job. For example, a job may be of job type A where A indicates the job must be printed and cut. Additional and/or alternate methodologies may be used within the scope of this disclosure.

In an embodiment, the historical variation associated with each job type may be analyzed over a processing interval to improve the processing flow by optimizing the configuration of one or more autonomous cells. For example, it may be more efficient to design autonomous cells for job types that are received frequently. In contrast, if a job type is received infrequently, it may be more efficient to manually process the job or to route it through a typical departmental production environment or other similar resource configuration rather than designing an autonomous cell to process the job.

In an embodiment, a plurality of jobs may be grouped according to a historical variation in volume over a processing interval associated with the job types. A processing interval may represent a certain period of time, such as a day, a week, a month or the like. A threshold coefficient of variation of the demand for the job type may be determined. A coefficient of variation of the demand may be the ratio of the standard deviation of the job demand distribution to the mean of the job demand distribution.

In an embodiment, a coefficient of variation may be determined for each job type and compared to the threshold coefficient of variation. If the coefficient of variation equals or exceeds the threshold coefficient, the job type may be classified as a high-variability job type. If the coefficient of variation is less than the threshold coefficient, the job type may be classified as a low-variability job type.

Figure 9A:
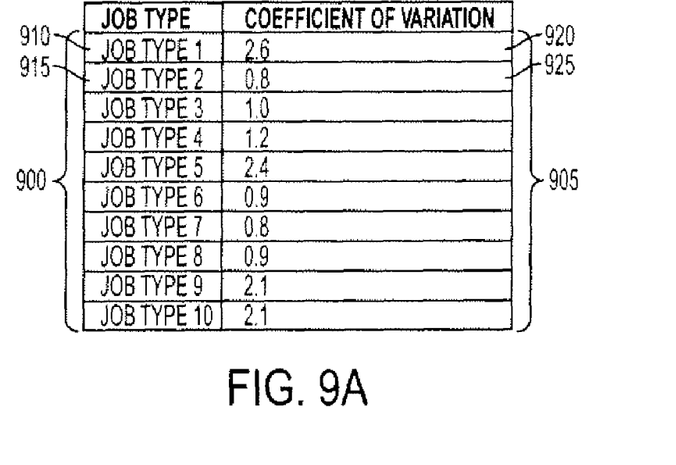
FIG. 9A illustrates a plurality of job types and corresponding coefficients of variation according to an embodiment.
Figure 9B:
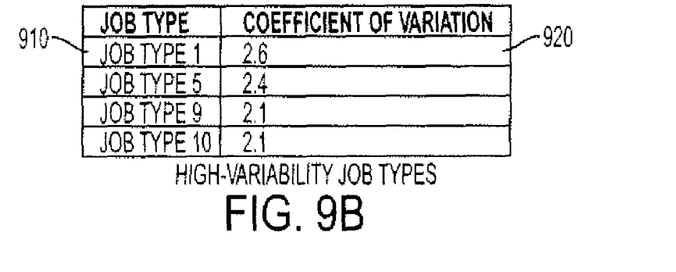
FIG. 9B depicts high-variability job types according to an embodiment.
Figure 9C:
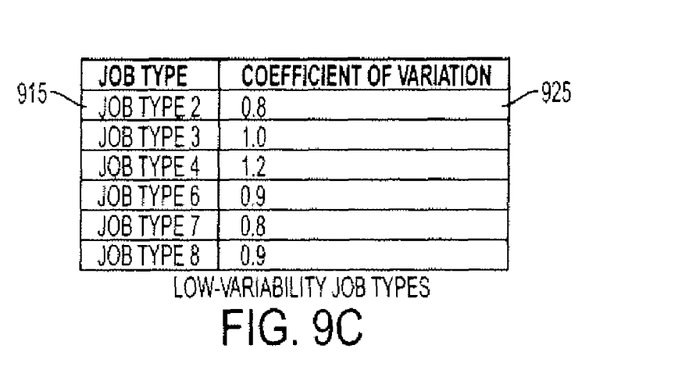
FIG. 9C depicts low-variability job types according to an embodiment.

FIG. 9A illustrates ten job types 900 and corresponding coefficients of variation 905. If the threshold coefficient is 1.5, for example, the job types may be grouped into high variability subgroups, as illustrated by FIG. 9B, and low variability subgroups, as illustrated by FIG. 9C. For example, Job Type 1's 910 coefficient of variation 920 (i.e., 2.6) is higher than the threshold coefficient (i.e., 1.5), so Job Type 1 910 may be classified as a high-variability job type. Similarly, Job Type 2's 915 coefficient of variation 925 (i.e., 0.8) is less than the threshold coefficient (i.e., 1.5), so Job Type 2 915 may be classified as a low-variability job type.

In an embodiment, autonomous cells may be designed to process low-variability job types while a departmental layout or other similar configuration may be used to process high-variability job types. As discussed above, each autonomous cell may include one or more resources necessary to complete a job type.

Figure 10:
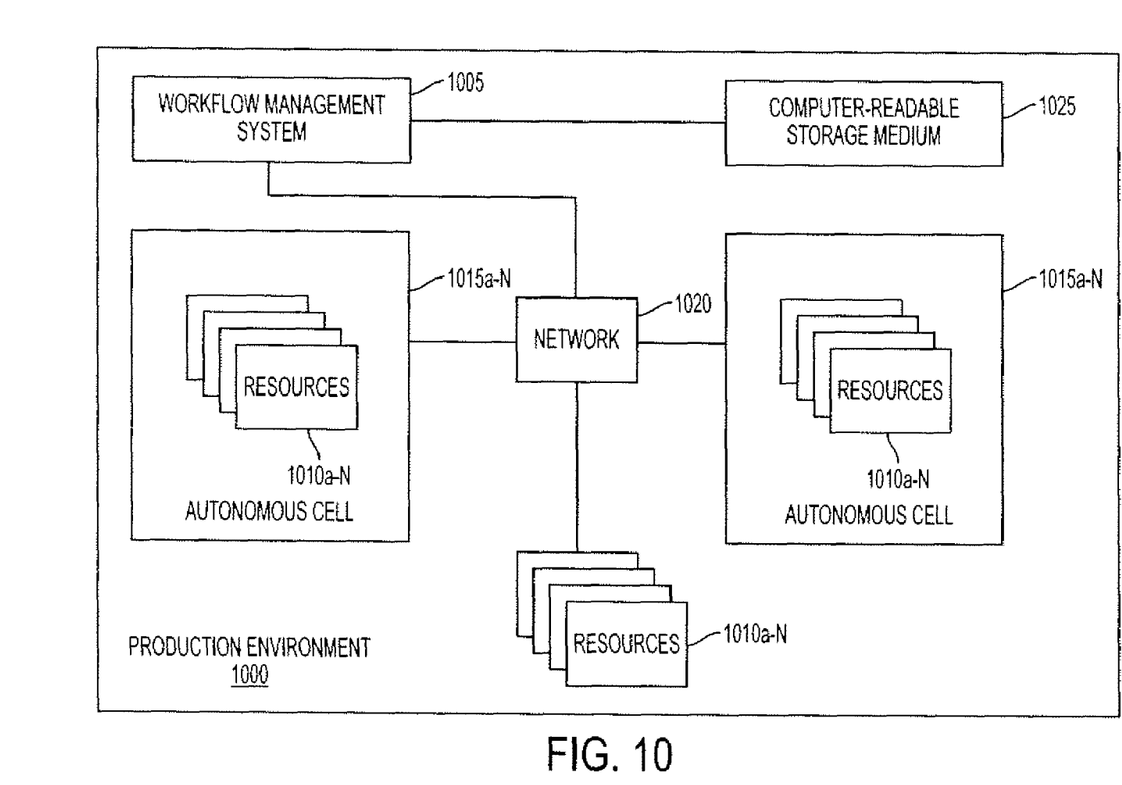
FIG. 10 depicts an exemplary environment suitable for processing a plurality of jobs according to an embodiment.

FIG. 10 depicts an environment suitable for practicing the illustrative embodiments. The production environment 1000 may include a workflow management system 1005 that is responsible for managing workflow in the production environment 1000 and a computer-readable storage medium 1025. The production environment 1000 may also include resources 1010a-N such as a printer, a copier, a binder, a hole-punch, a collator, a sealer or any other equipment used to process jobs. The resources may be grouped into autonomous cells 1015a-N such that each autonomous cell 1015a-N includes one or more resources 1010a-N necessary to process at least one job type. The workflow management system 1005 may be implemented on a stand-alone computer system or may be integrated into the resources. The workflow management system 1005 may also be implemented by distributed components such as separate electronic devices. A network 1020 may interconnect the resources 1010a-N with the workflow management system 1005, as illustrated in FIG. 10. The network 1020 may include a local area network (LAN) or a wide area network (WAN) such as the Internet, the World Wide Web or the like. The network 1020 may also be formed by communication links that interconnect the workflow management system 1005 and the resources 1010a-N. Alternatively, the disclosed embodiments may be practiced in environments where there is no network connection.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The above-described embodiments provide an improved approach for effectively handling heavy tailed distributions in a document production environment.

What is claimed is:

1. A production printing system for processing a plurality of print jobs, the production printing system comprising:
a plurality of print job processing devices;
a computing device in communication with the plurality of print job processing devices; and
a non-transitory computer-readable storage medium in communication with the computing device, wherein the computer-readable storage medium comprises one or more programming instructions for:
identifying a print job size distribution for a plurality of print jobs in a document production environment, wherein the print job size distribution has a minimum print job size value and a maximum print job size value;
determining whether the print job size distribution exhibits a heavy-tail characteristic;
for each print job size distribution exhibiting a heavy-tail characteristic, grouping the plurality of print jobs into a plurality of subgroups such that at least one of the plurality of subgroups exhibits a non-heavy-tail characteristic, wherein grouping the plurality of print jobs comprises:
selecting a job size threshold value between the minimum print job size value and the maximum print job size value,
splitting the print job size distribution into a first distribution segment and a second distribution segment based on the selected job size threshold value, and
determining whether the first distribution segment exhibits a heavy-tail characteristic; and
processing each job in the at least one of the plurality of subgroups exhibiting the non-heavy-tail characteristics with one or more of the print job processing devices.

2. The system of claim 1, wherein the print processing devices are arranged into one or more autonomous cells, wherein each autonomous cell is capable of completely processing at least one of the plurality of print jobs.

3. The system of claim 1, wherein determining whether the print job size distribution exhibits a heavy-tail characteristic is performed with a workflow management system operable to coordinate a distribution of print jobs to one or more autonomous cells.

4. The system of claim 1, wherein the one or more programming instructions for determining whether the print job size distribution exhibits a heavy-tail characteristic comprises one or more programming instructions for:
determining a complementary cumulative density function for the print job size distribution;
if an index of stability of the complementary cumulative density function is less than a threshold value, identifying the print job size distribution as a heavy-tailed distribution; and
if the index of stability of the complementary cumulative density function exceeds a threshold value, identifying the print job size distribution as a thin-tailed distribution.

5. The system of claim 1, wherein the computer-readable storage medium further comprises one or more programming instructions for corresponding the first and second distribution segments with a right-most distribution segment and a left-most distribution segment, respectively.

6. The system of claim 1, in which each of the plurality of print jobs corresponds with a print job type, wherein the computer-readable storage medium further comprises:
analyzing historical variation associated with each job type over a processing interval; and
using the historical variation to optimize a configuration of one or more autonomous cells.

7. The system of claim 1, in which each one of the plurality of print jobs corresponds with one or more print job types, wherein the one or more programming instructions for grouping the plurality of print jobs comprises one or more programming instructions for forming at least one of the plurality of subgroups on the basis of a historical variation in volume over a processing interval associated with the corresponding print job types.

8. The system of claim 1 in which each one of the plurality of print jobs corresponds with a print job type, wherein the computer-readable storage medium further comprises one or more programming instructions for:
determining a coefficient of variation for a demand distribution for a selected print job type;
comparing the coefficient of variation to a threshold coefficient;
if the coefficient of variation exceeds the threshold coefficient, identifying the selected job type as a high-variability job type; and if the coefficient of variation does not exceed the threshold coefficient, identifying the selected job type as a low-variability job type.

9. The system of claim 8, wherein the computer-readable storage medium further comprises one or more programming instructions for configuring one of the one or more autonomous cells to correspond with the low variability job type.

10. A method of processing a plurality of jobs in a production environment, the method comprising:
identifying, with a computer, a job size distribution for a plurality of jobs in a production environment, wherein the print job size distribution has a minimum print job size value and a maximum print job size value;
determining, with the computer, whether the job size distribution exhibits a heavy-tail characteristic;
for each job size distribution exhibiting a heavy-tail characteristic:
grouping the plurality of jobs into a plurality of subgroups such that at least one subgroup does not exhibit a heavy-tail characteristic, wherein grouping the plurality of print jobs comprises:
selecting a job size threshold value between the minimum print job size value and the maximum print job size value,
splitting the print job size distribution into a first distribution segment and a second distribution segment based on the selected job size threshold value, and
determining whether the first distribution segment exhibits a heavy-tail characteristic,
configuring one or more job processing devices in the production environment for one or more of the subgroups that do not exhibit the heavy-tail characteristic, and
processing the one or more subgroups that do not exhibit the heavy-tail characteristic with the one or more job processing devices.

11. The method of claim 10, further comprising arranging the job processing devices into one or more autonomous cells wherein each autonomous cell is capable of completely processing at least one of the plurality of jobs.

12. The method of claim 10, wherein determining whether the job size distribution exhibits a heavy-tail characteristic comprises:
determining a complementary cumulative density function for the job size distribution;
if an index of stability of the complementary cumulative density function is less than a threshold value, identifying the job size distribution as a heavy-tailed distribution; and
if the index of stability of the complementary cumulative density function exceeds the threshold value, identifying the job size distribution as a thin-tailed distribution.

13. The method of claim 10, wherein determining whether any of the plurality of distribution segments exhibits a heavy-tail characteristic comprises, for each distribution segment:
determining a cumulative density distribution function;
if an index of stability of the complementary cumulative distribution function is less than a threshold value, identifying the distribution segment as a heavy-tailed distribution; and
if an index of stability of the complementary cumulative distribution function exceeds the threshold value, identifying the distribution segment as a thin-tailed distribution.

14. The method of claim 10, wherein processing one or more subgroups comprises:
identifying the jobs associated with a subgroup, wherein each job has a job type;
selecting a job type; and
analyzing a characteristic of the selected job type over a processing interval.

15. The method of claim 14, wherein analyzing a characteristic of the selected job type comprises:
determining a coefficient of variation for the selected job type;
comparing the coefficient of variation to a threshold coefficient;
if the coefficient of variation exceeds the threshold coefficient, identifying the selected job type as a high-variability job type; and
if the coefficient of variation does not exceed the threshold coefficient, identifying the selected job type as a low-variability job type.

16. The method of claim 15, further comprising:
if the selected job type is a low-variability job type, designing an autonomous cell to process the selected job type, wherein the autonomous cell includes one or more devices in the document production environment necessary to process the selected job type.

17. A production printing system for processing a plurality of print jobs, the production printing system comprising:
a plurality of print job processing devices;
a computing device in communication with the plurality of print job processing devices; and
a non-transitory computer-readable storage medium in communication with the computing device, wherein the computer-readable storage medium comprises one or more programming instructions for:
identifying a print job size distribution for a plurality of print jobs in a document production environment, wherein each one of the plurality of print jobs corresponds with a print job type,
determining whether the print job size distribution exhibits a heavy-tail characteristic,
for each print job size distribution exhibiting a heavy-tail characteristic, grouping the plurality of print jobs into a plurality of subgroups such that at least one of the plurality of subgroups exhibits a non-heavy-tail characteristic,
processing each job in the at least one of the plurality of subgroups exhibiting the non-heavy-tail characteristics with one or more of the print job processing devices,
analyzing historical variation associated with each job type over a processing interval, and
using the historical variation to optimize a configuration of one or more autonomous cells.

18. The system of claim 17, wherein the print processing devices are arranged into one or more autonomous cells, wherein each autonomous cell is capable of completely processing at least one of the plurality of print jobs.

19. The system of claim 17, wherein determining whether the print job size distribution exhibits a heavy-tail characteristic is performed with a workflow management system operable to coordinate a distribution of print jobs to one or more autonomous cells.

20. The system of claim 17, wherein the one or more programming instructions for determining whether the print job size distribution exhibits a heavy-tail characteristic comprise one or more programming instructions for:
determining a complementary cumulative density function for the print job size distribution, if an index of stability of the complementary cumulative density function is less than a threshold value, identifying the print job size distribution as a heavy-tailed distribution, and if the index of stability of the complementary cumulative density function exceeds a threshold value, identifying the print job size distribution as a thin-tailed distribution.

21. The system of claim 17 in which each one of the plurality of print jobs corresponds with a print job type, wherein the computer-readable storage medium further comprises one or more programming instructions for:

determining a coefficient of variation for a demand distribution for a selected print job type, comparing the coefficient of variation to a threshold coefficient, if the coefficient of variation exceeds the threshold coefficient, identifying the selected job type as a high-variability job type, and if the coefficient of variation does not exceed the threshold coefficient, identifying the selected job type as a low-variability job type.

22. The system of claim 21, wherein the computer-readable storage medium further comprises one or more programming instructions for configuring one of the one or more autonomous cells to correspond with the low variability job type.

23. A method of processing a plurality of jobs in a production environment, the method comprising:

identifying a print job size distribution for a plurality of print jobs in a document production environment;

determining whether the print job size distribution exhibits a heavy-tail characteristic;

for each print job size distribution exhibiting a heavy-tail characteristic, grouping the plurality of print jobs into a plurality of subgroups such that at least one of the plurality of subgroups exhibits a non-heavy-tail characteristic;

processing each job in the at least one of the plurality of subgroups exhibiting the non-heavy-tail characteristics with one or more of the print job processing devices;

analyzing historical variation associated with each job type over a processing interval; and using the historical variation to optimize a configuration of one or more autonomous cells.

24. The method of claim 23, further comprising arranging the job processing devices into one or more autonomous cells wherein each autonomous cell is capable of completely processing at least one of the plurality of jobs.

25. The method of claim 23, wherein determining whether the job size distribution exhibits a heavy-tail characteristic comprises:

determining a complementary cumulative density function for the job size distribution;

if an index of stability of the complementary cumulative density function is less than a threshold value, identifying the job size distribution as a heavy-tailed distribution; and if the index of stability of the complementary cumulative density function exceeds the threshold value, identifying the job size distribution as a thin-tailed distribution.

26. The method of claim 23, wherein processing one or more subgroups comprises:

identifying the jobs associated with a subgroup, wherein each job has a job type;

selecting a job type; and analyzing a characteristic of the selected job type over a processing interval.

27. The method of claim 23, wherein analyzing a characteristic of the selected job type comprises:

determining a coefficient of variation for the selected job type;

comparing the coefficient of variation to a threshold coefficient;

if the coefficient of variation exceeds the threshold coefficient, identifying the selected job type as a high-variability job type; and if the coefficient of variation does not exceed the threshold coefficient, identifying the selected job type as a low-variability job type.

28. The method of claim 27, further comprising:

if the selected job type is a low-variability job type, designing an autonomous cell to process the selected job type, wherein the autonomous cell includes one or more devices in the document production environment necessary to process the selected job type.

* * * * *